United States Patent
Lem et al.

(10) Patent No.: US 10,300,823 B2
(45) Date of Patent: May 28, 2019

(54) METHOD AND APPARATUS FOR CONTROLLING MASSAGE FUNCTIONS OF A MOTOR VEHICLE SEAT

(71) Applicant: Ford Global Technologies, LLC, Dearborn, MI (US)

(72) Inventors: Jeroen Lem, Maastricht (NL); Steve Michell, Commerce, MI (US); Florian Golm, Herzogenrath (DE); Stefan Wolter, Aachen (DE); Johnathan Andrew Line, Northville, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 690 days.

(21) Appl. No.: 13/948,950

(22) Filed: Jul. 23, 2013

(65) Prior Publication Data
US 2014/0025258 A1 Jan. 23, 2014

(30) Foreign Application Priority Data
Jul. 23, 2012 (DE) .......... 10 2012 212 834

(51) Int. Cl.
*B60N 2/90* (2018.01)
(52) U.S. Cl.
CPC ............. *B60N 2/914* (2018.02); *B60N 2/976* (2018.02)
(58) Field of Classification Search
None
See application file for complete search history.

(56) References Cited

U.S. PATENT DOCUMENTS

| | | | | |
|---|---|---|---|---|
| 4,833,614 A | * | 5/1989 | Saitoh et al. | 701/49 |
| 5,155,685 A | * | 10/1992 | Kishi et al. | 701/49 |
| 5,792,080 A | * | 8/1998 | Ookawa et al. | 601/115 |
| 6,049,748 A | * | 4/2000 | Newman et al. | 701/49 |
| 6,120,468 A | * | 9/2000 | Tseng | 601/46 |
| 6,203,105 B1 | * | 3/2001 | Rhodes, Jr. | 297/284.6 |
| 6,375,630 B1 | * | 4/2002 | Cutler et al. | 601/57 |
| 6,682,494 B1 | * | 1/2004 | Sleichter et al. | 601/57 |
| 7,043,699 B2 | * | 5/2006 | Obradovich | 715/790 |
| 7,152,920 B2 | * | 12/2006 | Sugiyama et al. | 297/284.6 |
| 7,172,247 B2 | * | 2/2007 | Beloch et al. | 297/284.7 |
| 7,311,681 B1 | * | 12/2007 | Vaccarella | 601/46 |
| 7,398,142 B2 | * | 7/2008 | Schüßler et al. | 701/36 |
| 7,447,575 B2 | * | 11/2008 | Goldbeck et al. | 701/36 |
| 7,654,614 B2 | * | 2/2010 | Schüßler et al. | 297/284.4 |
| 2002/0068887 A1 | * | 6/2002 | Kikumoto et al. | 601/49 |

(Continued)

FOREIGN PATENT DOCUMENTS

| CN | 102449589 A | 5/2012 | |
|---|---|---|---|
| DE | 4331663 C1 * | 3/1995 | G05D 3/00 |

(Continued)

*Primary Examiner* — Nicholas K Wiltey
(74) *Attorney, Agent, or Firm* — Vichit Chea; Price Heneveld LLP

(57) ABSTRACT

A method for controlling and selecting massage functions of a motor vehicle seat and include the steps of: switching the system to a selection mode and starting the selection mode; scrolling through massage functions that are organized in a block-by-block manner, wherein the massage functions that are organized in a block-by-block manner include a specific massage zone per block; confirming a selection of the massage block by way of a user selection; and terminating the selection mode.

16 Claims, 3 Drawing Sheets

(56) References Cited

U.S. PATENT DOCUMENTS

| | | | |
|---|---|---|---|
| 2002/0111570 A1* | 8/2002 | Cutler et al. | 601/15 |
| 2002/0145512 A1* | 10/2002 | Sleichter et al. | 340/407.1 |
| 2003/0038517 A1* | 2/2003 | Moran et al. | 297/284.3 |
| 2006/0049678 A1* | 3/2006 | Kern et al. | 297/284.3 |
| 2006/0155429 A1* | 7/2006 | Boone et al. | 701/1 |
| 2007/0200392 A1* | 8/2007 | Eiswirth | 296/190.02 |
| 2008/0059907 A1* | 3/2008 | Jakobsson | G06F 3/0482 715/841 |
| 2009/0099490 A1* | 4/2009 | Durt et al. | 601/115 |
| 2010/0187213 A1* | 7/2010 | Cheatham, II | 219/202 |
| 2010/0228436 A1* | 9/2010 | Nezu et al. | 701/36 |
| 2010/0286867 A1* | 11/2010 | Bergholz et al. | 701/36 |
| 2011/0055720 A1* | 3/2011 | Potter et al. | 715/747 |
| 2011/0276266 A1* | 11/2011 | Ballew et al. | 701/201 |
| 2012/0032478 A1* | 2/2012 | Friderich et al. | 297/180.1 |
| 2013/0038102 A1* | 2/2013 | Friderich et al. | 297/217.4 |
| 2014/0025258 A1* | 1/2014 | Lem et al. | 701/36 |
| 2014/0032043 A1* | 1/2014 | Line et al. | 701/36 |

FOREIGN PATENT DOCUMENTS

| | | |
|---|---|---|
| DE | 102004037069 A1 | 4/2005 |
| EP | 1839932 B1 | 12/2010 |

\* cited by examiner

METHOD AND APPARATUS FOR CONTROLLING MASSAGE FUNCTIONS OF A MOTOR VEHICLE SEAT

FIELD OF THE INVENTION

The present invention generally relates to a method for controlling and selecting massage functions of a motor vehicle seat, which method renders possible a simple and intuitive adjustment. This object is achieved by way of the method described herein.

BACKGROUND OF THE INVENTION

It is generally known to equip seats in motor vehicles with massage functions, for example, for the lumbar supports and the actual seating surface. However, it is problematic for the user to operate the control system in a simple and intuitive manner, especially as the driver must perform the method while driving. It is usually necessary to reach a compromise between the variety of controls and the level of detail and also the level of simplicity and the model/shape provided. Known systems are frequently complex and laborious to use, which limits their usability in the motor vehicle environment.

SUMMARY OF THE INVENTION

According to one aspect of the present invention, a method for controlling and selecting massage functions of a motor vehicle seat includes a plurality of massage zones disposed on at least one of a seat and a seat back. A selection mode is provided and started. A plurality of massage functions are scrolled through and organized in a block-by-block manner. The massage functions include a specific massage zone per block. A selection of the massage block is confirmed by way of a user selection. The selection mode is terminated.

According to another aspect of the present invention, a method for controlling and selecting massage functions of a motor vehicle seat includes providing a selection mode. The selection mode is started. A plurality of massage functions are scrolled through and organized in a block-by-block manner. The massage functions include a specific massage zone per block. A selection of the massage block is confirmed by way of a user selection. The selection mode is terminated.

According to yet another aspect of the present invention, a massage assembly for a vehicle seat includes a seat and a seatback. A plurality of massage zones are disposed on at least one of the seat and seatback. A control is operably coupled to the seat and seatback. The control includes a selection mode that provides a block list of organized massage functions having a specific massage zone per block. An interface is configured to receive input from a user pertaining to a selected massage function.

These and other aspects, objects, and features of the present invention will be understood and appreciated by those skilled in the art upon studying the following specification, claims, and appended drawings.

BRIEF DESCRIPTION OF THE DRAWINGS

Further features and details of the invention are evident in the following description of the drawings. In the drawings.

DETAILED DESCRIPTION OF EMBODIMENTS

Figure 1:
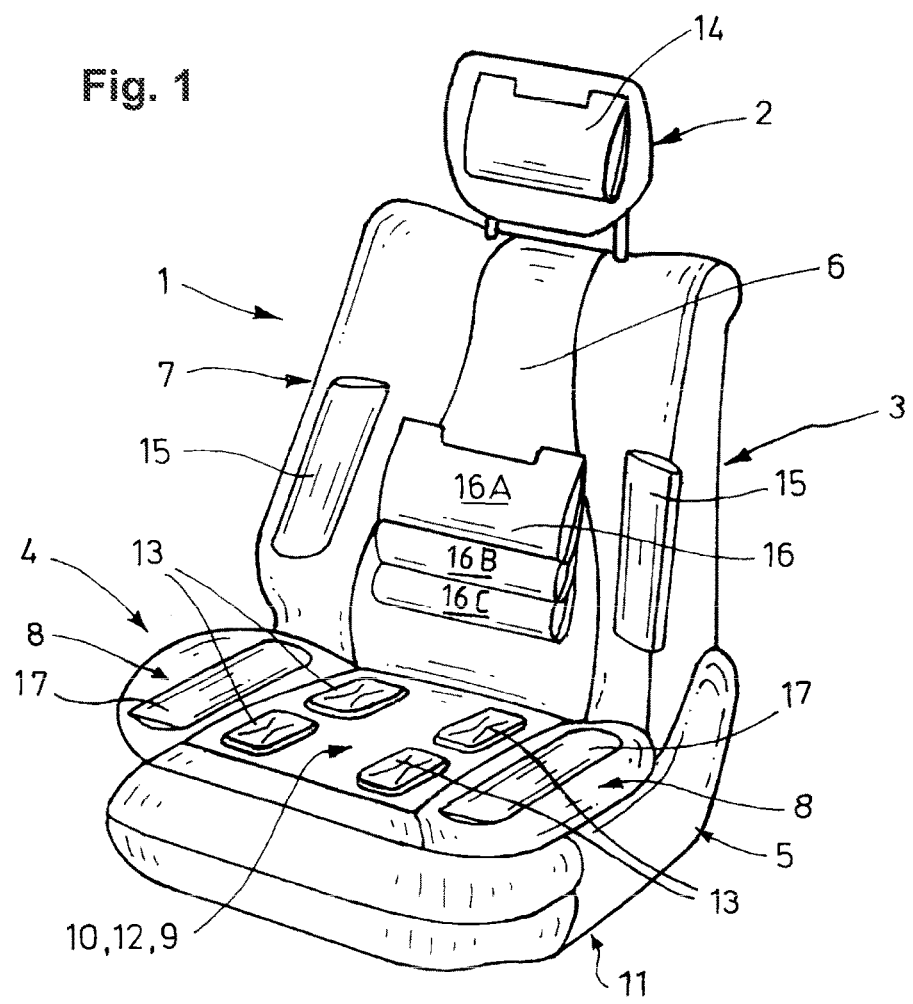
FIG. 1 illustrates a perspective and schematic view of a motor vehicle seat.

For purposes of description herein, the terms "upper," "lower," "right," "left," "rear," "front," "vertical," "horizontal," and derivatives thereof shall relate to the invention as oriented in FIG. 1. However, it is to be understood that the invention may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

In accordance with the invention, it has become known that an extensive simplification of the selection method and intuitive operation can be achieved if, within the framework of the method for controlling and selecting massage functions of a motor vehicle seat, in the selection mode the massage functions are organized and scrolled through in a block-by-block manner, wherein the massage functions include a specific massage zone per block. Finally, the massage block currently being scrolled through is confirmed as a selection by way of a user selection and the selection mode is terminated by the user if the user is finished with selecting and configuring the massage requirements. Consequently, a desired massage can be provided per massage zone in a simple manner by way of combining, adding, or deleting massage functions that are organized in a block-by-block manner.

The massage functions that are organized in a block-by-block manner may include for the massage zone at least one specific massage option that is selected from a group that includes the massage intensity, the massage shape, the massage duration, and the massage pattern. It is expedient to make a selection in a simplified manner if the massage functions that are organized in a block-by-block manner are scrolled through in a recursive manner. All the programmed massage blocks can therefore be scrolled through cyclically and quickly, so that it is not necessary for the user to know all blocks, rather the user is able to make a selection on an ad hoc basis.

It is likewise possible to edit the respective massage block by way of a user selection. This can be provided in a simple manner by way of selecting predefined setting parameters (e.g., the massage intensity, the massage shape, the massage duration, the massage pattern). The term "massage shape" refers to the different timed sequence in which the massage actuators are controlled, for example, air cushions, in order to create a model or shape of the massage (e.g., waves). The term "massage pattern" refers to the direction of the timed sequence in which the massage actuators are controlled, for example from the bottom upwards, from the top downwards, etc.

It is likewise possible, that all massage functions are scrolled through in a recursive manner and the massage function that is currently being scrolled through is confirmed as the selection by way of a user selection. Stated differently, the functions of the massage are all independently briefly previewed, so that the user can decide whether the function is appealing. If the function is appealing, the user confirms the selection and the group of massage functions, as noted above, is scrolled through.

In principle, each possible setting of a massage system can be selected using the method in accordance with the invention. It is not then necessary for the driver and/or the user to perform any distracting actions or to read a display, with the exception of starting (setting the system to a selection mode) and the respective confirmation (e.g., pressing a button on the steering wheel, a voice command, etc.). He or she can simply wait until the desired setting that is organized in a block-by-block manner is offered, and select this setting. However, this process can also lead the user to the desired setting without the user having prior knowledge of the system and the functions.

All the programmed massage shapes can be scrolled through cyclically and quickly. This includes the preprogrammed set shapes that scroll through activity shapes during the massage using animations of a respective zone and, where necessary, of several zones. The selection mode for each massage block can be individually selected in order, for example, to edit or change the particular selection mode. In one embodiment, it is also possible for the user to arrange a massage sequence by way of selecting and determining the sequence of the massage blocks.

With reference to the embodiment generally illustrated in FIG. 1, reference numeral 1 generally designates a seat in accordance with the present invention from an inclined perspective, wherein the transparency renders it possible to view the interior of the seat. The seat 1 includes a head support 2 that is arranged at the top on a back rest 3, which the back rest 3 is in turn coupled to an actual seat 4 by way of a hinge joint 5, which can be adjusted. The seat 1 is supported by a sheet steel frame 11 that is arranged under the actual seating surface and is connected to the vehicle. The back rest 3 includes an overlay 6 that has an approximately S-shaped longitudinal section, which overlay 6 is anatomically formed for the back of the occupant and is delimited at the sides by protruding fins 7, which provide the occupant with lateral support. The actual seat 4 likewise includes an overlay 9 that defines the actual seating surface. Fins 8 are provided that protrude at the sides and provide the occupant with support in particular as the vehicle negotiates bends.

The overlay 9 is embodied from a foam block 10 that is formed from a suitable natural and/or synthetic material, which is upholstered using a suitable material, such as leather. It is necessary for the overlay 9 to include the conventional and known characteristics, such as to provide cushioning, to absorb shocks, to transport moisture, etc. In addition, it is possible to provide heating and/or cooling devices in the overlay 9. A support plate 12 that is embodied from a stiff material is provided under the foam block 10, as can be easily recognized in FIG. 1. The support plate 12 is arranged under the rear region of the seating surface, which is generally occupied by the buttocks of the occupant.

An air cushion 13 is provided under the support plate 12 and above the sheet steel frame 11, between the support plate 12 and the sheet steel frame 11, which air cushion 13 by way of a compressor, valves, and a control unit, renders it possible to adjust and improve the shock absorbing characteristics of the seat 1 by means of adjusting the air pressure even when the vehicle is traveling. The control unit can automatically regulate the air pressure in the air cushion 13 after the data, provided by the sensors regarding the driving situation and the occupant, have been evaluated. A manual adjustment, input, or intervention into the automatic control process is also feasible.

The seat 1 also includes air cushions 14, 15, 16, 17 in the fins 7, 8, the overlay 6, and the head support 2, which air cushions 14, 15, 16, 17 are used for the massage function and to adjust the contour. The air cushions 14, 15, 16, 17 can likewise be used and/or regulated by way of the previously mentioned control unit. In addition, in the event of a vehicle collision the air cushions 14, 15, 16, 17 can be inflated and used as additional impact protection in order to prevent the occupant from making contact with the sheet steel frame 11 of the seat 1.

Four additional air cushions 13 are provided under the actual seat 4 between the support plate 12 and the sheet steel frame 11. The air cushions 13 are arranged in such a manner that air cushions 13 lie under the corners of the approximately rectangular seating surface. The four mutually independently controllable and inflatable air cushions 13 under the support plate 12 render it possible in addition to vertically position the support plate 12 to tilt the support plate 12 about two axes that extend in parallel to the plane of the surface of the actual seat 4 and in a perpendicular manner with respect to each other. As a consequence, the pelvis of the occupant can be tilted in the direction from the front towards the rear and vice versa, which is relaxing and may be used, for example during spinal exercises. It is particularly helpful to tilt the pelvis in this manner in order to avoid back pain. This movement can be coupled with a tilting movement from left to right, so that the fatigue associated with the pelvic movement caused by the alternating periodic tensing and relaxing of the muscles is avoided in a particularly efficient manner. As a consequence, it is clear that extremely different massage shapes, intensities, and duration periods are possible by virtue of the programmed control of the air cushions and zones. The different massage functions are organized in a block-by-block manner, in other words per massage zone, pelvic tilting, or lumbar massage, the massage functions are grouped for ease of selection. By way of example, the method for selecting and controlling massage functions is explained with reference to only two massage blocks, namely, the lumbar massage and the pelvic tilting. It is clear that many user-defined massage blocks can be used within the scope of the method.

The driver initially sets the massage control system of the seat 1 to a selection mode by pressing a corresponding button on the side of the seat 1, as a consequence of which the selection mode starts. Initially, the programmed massage blocks for the lumbar massage and the pelvic tilting are then loaded (Step 1). Subsequently, all the massage blocks are scrolled through cyclically and quickly and the user can obtain their selection by confirming the massage block currently being previewed.

Initially, the preview of the lumbar massage massage block is presented to the user, in other words the different control shape, durations, and intensities of air cushions 16A, 16B, 16C that are preprogrammed in the current block are previewed for a short period of time (Step II), so that the user can make a decision (Step III). If the currently previewed shape does not appeal, the user waits until the next massage block is previewed (arrow Z1). As a consequence, the currently previewed massage block is not selected. If, on the other hand, the user would like to edit the massage block, the user actuates an alternative button and the editing mode (F1) for the lumbar massage shape block is started (arrow X1).

Figure 2:
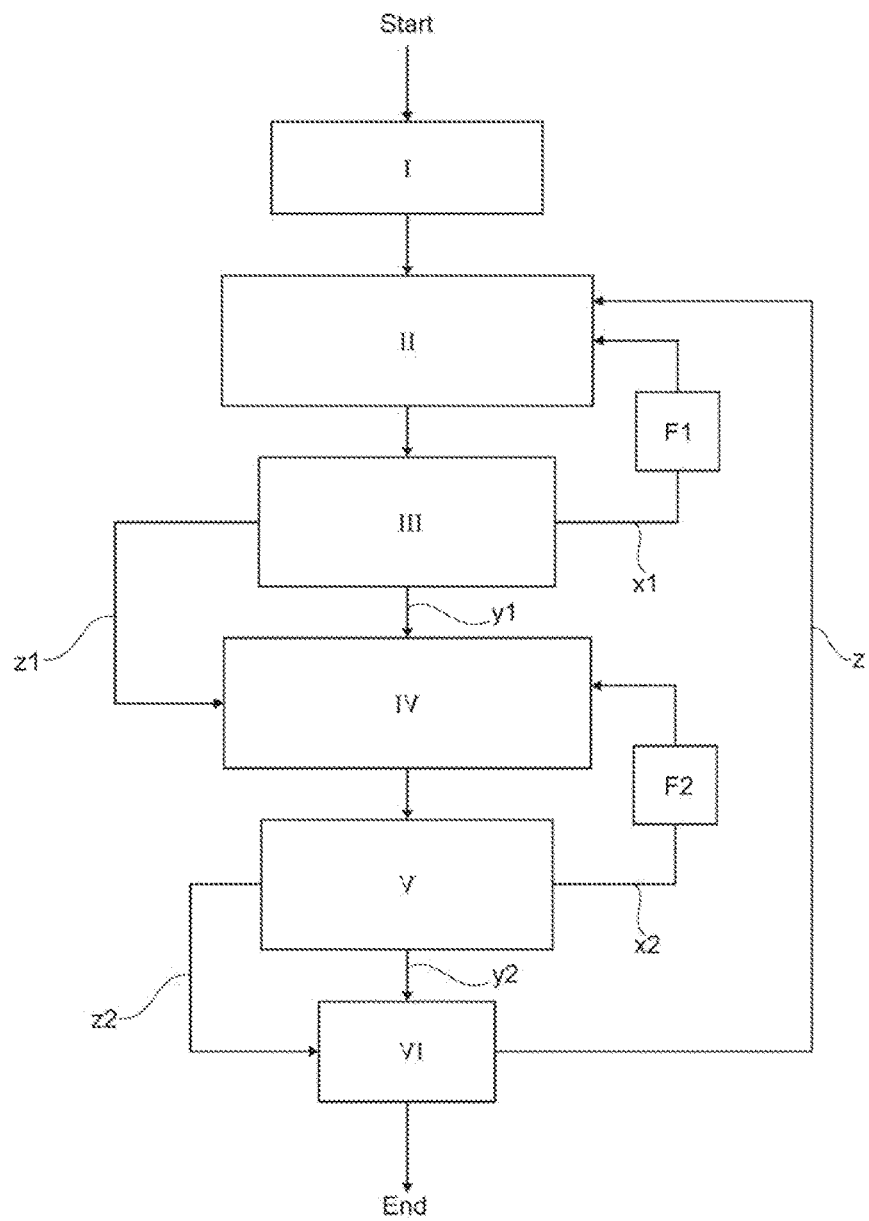
FIG. 2 illustrates a schematic flow diagram of the method in accordance with the invention for controlling and selecting massage functions of the motor vehicle seat in FIG. 1.
Figure 3:
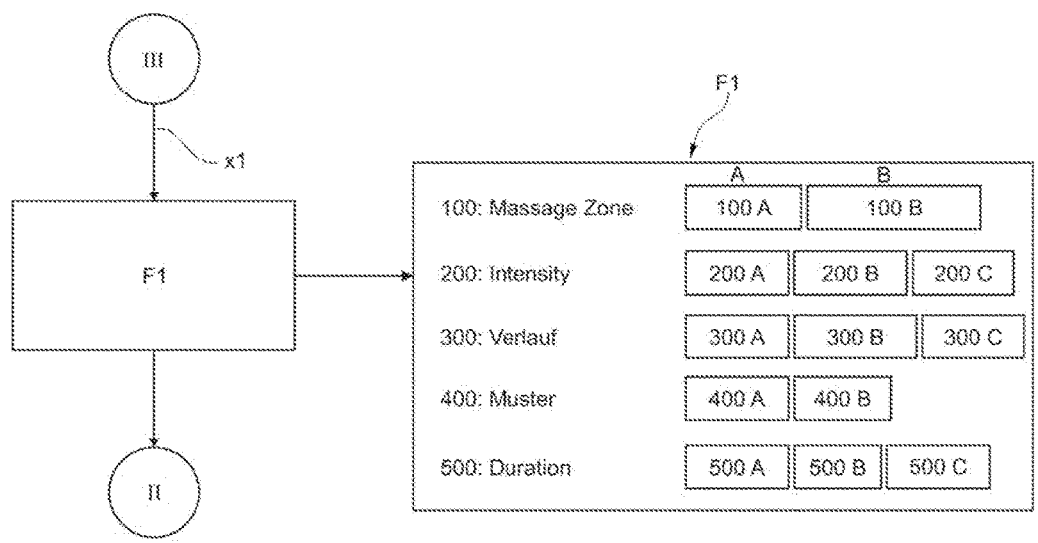
FIG. 3 exemplifies an editing mode for a lumbar massage shape block.

The editing mode F1 for the lumbar massage shape block is illustrated in an exemplary manner in FIG. 3. In the editing mode F1, the user can change the massage options and massage zone of the respective massage block using an interface, for example, by way of a touch screen display. Massage zones 100A (lumbar), 100B (pelvis), intensities 200A (low), 200B (medium); 200C (high), massage patterns 300A (moving upwards), 300B (alternating between moving upwards and downwards), 300C (moving downwards), massage shape 400A (waves), 400B (basic), and massage duration 500A (1 min.), 500B (5 min.), and 500C (10 min.) are offered to the user for this purpose, wherein predefined selection settings are provided, which settings are selected and saved by way of touching the relevant button of the touch display. After termination of the editing mode F1, the user returns to the selection mode of the relevant block, in other words to Step II of FIG. 2, by way of pressing the corresponding button. If the massage block appeals to the user, the user confirms the selection (arrow Y1) and the selected lumbar massage shape block is saved and set. Thereafter, the preview of the pelvic tilting massage block is presented to the user, in other words the different control shape, durations, and intensities of the air cushion 13 that are preprogrammed in the current block are previewed for a short period of time (Step IV), so that the user can make a decision (Step V). If the shape does not appeal to the user, the user waits until the next massage block is previewed (arrow Z2). As a consequence, the currently previewed massage block is not selected. If the shape appeals to the user, the user confirms the selection (arrow Y2) and the selected pelvic tilting shape block is saved and set. If the user would like to edit the massage block, the user actuates an alternative button and an editing mode (F2) for the pelvic tilt shape block is started (arrow X2). This takes place in a similar manner to the lumbar massage shape block in FIG. 3. Finally, the driver terminates the selection mode (Step VI) of the massage control system of the seat 1 by way of pressing a corresponding button on the side of the seat 1. Alternatively, the user can return to the start of the selection mode (arrow Z) by way of pressing a corresponding button in order to again select and/or change the blocks. It is clear that the method described in an exemplary manner can also be used to achieve a recursive selection of all possible parameters and functions of the massage possibilities.

It is to be understood that variations and modifications can be made on the aforementioned structure without departing from the concepts of the present invention, and further it is to be understood that such concepts are intended to be covered by the following claims unless these claims by their language expressly state otherwise.

It will be understood by one having ordinary skill in the art that construction of the described invention and other components is not limited to any specific material. Other exemplary embodiments of the invention disclosed herein may be formed from a wide variety of materials, unless described otherwise herein.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It is also important to note that the construction and arrangement of the elements of the invention as shown in the exemplary embodiments is illustrative only. Although only a few embodiments of the present innovations have been described in detail in this disclosure, those skilled in the art who receive this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present invention. The exemplary structures and processes disclosed herein are for illustrative purposes and are not to be construed as limiting.

It is also to be understood that variations and modifications can be made on the aforementioned structures and methods without departing from the concepts of the present invention, and further it is to be understood that such concepts are intended to be covered by the following claims unless these claims by their language expressly state otherwise.

What is claimed is:

1. A method for implementing massage functions of a motor vehicle seat having a plurality of massage zones disposed on at least one of a seat and a seat back, the method comprising the steps of:
   starting a selection mode;
   while in the selection mode:
      scrolling through designation of a plurality of massage functions organized in a block-by-block manner as a selectable massage function, wherein each of the massage functions includes a specific massage zone per block;
      receiving a selection of the selectable massage function and adding the selectable massage function to a massage sequence; and
      resuming scrolling through designation of the plurality of massage functions as the selectable massage function;
   terminating the selection mode; and
   operating at least one massage device within at least one of the plurality of massage zones according to the massage sequence;
   wherein the massage functions are automatically scrolled through, after a predetermined time interval, in designation as a selectable massage function and the selectable massage function is previewed for a predetermined amount of time by physical implementation thereof before one of further automatic scrolling and receiving the selection from the user.

2. The method of claim 1, wherein the massage functions organized in a block-by-block manner include at least one specific massage option for the massage zone, which massage option is selected from the group comprising: massage intensity, massage shape, massage duration, and massage pattern.

3. The method of claim 2, wherein the massage functions organized in a block-by-block manner are scrolled through for designation as the selectable massage function in a recursive manner such that multiple ones of the massage functions can be added to the massage sequence when respectively designated as the selectable massage function.

4. The method of claim 3, wherein
the massage functions are scrolled through for designation as a selectable massage function cyclically.

5. The method of claim 2, further including:
receiving an edit command from the user relating to the selectable massage function;
scrolling through designation of a plurality of variations of the specific massage option as a selectable edit; and
receiving a selection of the selectable edit as a selected edit from a user and associating the selected edit with the respective massage zone.

6. The method of claim 1, wherein the massage functions organized in a block-by-block manner are scrolled through in a recursive manner.

7. A method implementing massage functions of a motor vehicle seat comprising the steps of:
starting a selection mode;
scrolling through designation of a plurality of massage functions organized in a block-by-block manner as a selectable massage function while in the selection mode, wherein the massage functions include a specific massage zone per block; and
receiving a first selection of the selectable massage function and adding the first selection to a massage sequence;
resuming scrolling through designation of the plurality of massage functions as the selectable massage function;
receiving a second selection of the selectable massage function from a user selection and adding the selectable massage function to the massage sequence;
terminating the selection mode; and
operating at least one massage device within one of a plurality of massage zones of the vehicle seat according to the massage sequence;
wherein the massage functions are scrolled through cyclically and are previewed for a predetermined amount of time before being receiving the selection from the user.

8. The method of claim 7, wherein the massage functions organized in a block-by-block manner include at least one specific massage option for the massage zone, which massage option is selected from the group comprising: massage intensity, massage shape, massage duration, and massage pattern.

9. The method of claim 8, wherein the massage functions organized in a block-by-block manner are scrolled through for designation as a selectable massage function in a recursive manner such that multiple ones of the massage functions can be added to the massage sequence when respectively designated as the selectable massage function.

10. The method of claim 7, wherein:
the massage functions are scrolled through for designation as a selectable massage function automatically, upon lapse of a predetermined time interval.

11. The method of claim 9, further including:
receiving an edit command from the user relating to the selectable massage function;
scrolling through designation of a plurality of variations of the specific massage option as a selectable edit; and
receiving a selection of the selectable edit as a selected edit from a user and associating the selected edit with the respective massage zone.

12. A vehicle seat comprising:
a seat;
a seatback;
a plurality of inflatable cushions within the seat and the seatback;
a compressor coupled with the cushions; and
a control:
previewing a designated selectable massage function for a predetermined period of time by causing the compressor to inflate and deflate one of the cushions corresponding to the massage function and receiving a selection of the selectable massage function for addition to a massage sequence;
automatically scrolling through a plurality of massage functions corresponding to respective ones of the cushions as the designated selectable massage function; and
adding a first one of the massage functions corresponding to the selectable massage function to a massage sequence upon receiving a first selection of the selectable massage function.

13. The vehicle seat of claim 12, wherein the control further provides for editing of the designated selectable massage function by way of an edit command received by the interface.

14. The vehicle seat of claim 12, wherein the control provides at least one specific massage option for each of a plurality of massage zones including at least one cushion, which massage option is selected from the group comprising: massage intensity, massage shape, massage duration, and massage pattern.

15. The vehicle seat of claim 14, wherein:
the control further includes an edit sub-mode within the selection mode that provides a scrollable block list of variations in the specific massage option; and
the interface is further configured to receive an input pertaining to a massage edit function.

16. The vehicle seat of claim 12, wherein the selection mode further includes:
continuing to automatically scroll through designation of massage functions as the selectable massage function and automatically previewing the selectable massage function; and
adding a second one of the massage functions corresponding to the selectable massage function to the massage sequence upon receiving a second selection of the selectable massage function.

* * * * *